(12) United States Patent
Stein et al.

(10) Patent No.: US 10,586,462 B1
(45) Date of Patent: Mar. 10, 2020

(54) METHODS OF SAFE OPERATION OF UNMANNED AERIAL VEHICLES

(71) Applicants: Eyal Stein, Sharon, MA (US); Steven Lu, Burlington, MA (US)

(72) Inventors: Eyal Stein, Sharon, MA (US); Steven Lu, Burlington, MA (US)

(73) Assignee: 5X5 TECHNOLOGIES, INC., St. Petersburg, FL (US)

(*) Notice: Subject to any disclaimer, the term of this patent is extended or adjusted under 35 U.S.C. 154(b) by 470 days.

(21) Appl. No.: 15/285,078

(22) Filed: Oct. 4, 2016

Related U.S. Application Data (60) Provisional application No. 62/237,120, filed on Oct. 5, 2015.

(51) Int. Cl.

| | | |
|---|---|---|
| *B64C 39/02* | (2006.01) | |
| *G08G 5/00* | (2006.01) | |
| *H04L 29/06* | (2006.01) | |
| *H04B 7/185* | (2006.01) | |
| *G08G 5/04* | (2006.01) | |
| *G08G 5/02* | (2006.01) | |
| *G05D 1/00* | (2006.01) | |
| *B64D 17/80* | (2006.01) | |
| *H04W 4/04* | (2009.01) | |

(52) U.S. Cl.
CPC ......... *G08G 5/006* (2013.01); *B64C 39/024* (2013.01); *B64D 17/80* (2013.01); *G05D 1/0011* (2013.01); *G05D 1/0055* (2013.01); *G08G 5/0008* (2013.01); *G08G 5/0013* (2013.01); *G08G 5/02* (2013.01); *G08G 5/045* (2013.01); *H04B 7/18506* (2013.01); *H04L 65/4076* (2013.01); *H04W 4/04* (2013.01); *B64C 2201/141* (2013.01)

(58) Field of Classification Search
CPC ........ G08G 5/006; G08G 5/0008; G08G 5/02; G08G 5/045; G08G 5/00; G08G 5/04; G05D 1/0055; G05D 1/0011; G05D 1/00; B64C 39/024; B64C 2201/141; B64D 17/80; H04B 7/18506; H04L 65/4076; H04L 29/06; H04W 4/04
See application file for complete search history.

(56) References Cited

U.S. PATENT DOCUMENTS

| | | | | |
|---|---|---|---|---|
| 3,876,980 | A | * 4/1975 | Haemmig | G08G 1/127 340/991 |
| 2002/0063653 | A1 | * 5/2002 | Oey | G01S 13/765 342/29 |
| 2011/0298648 | A1 | * 12/2011 | Ferro | G08G 5/0008 342/29 |
| 2016/0288905 | A1 | * 10/2016 | Gong | H04L 63/101 |

FOREIGN PATENT DOCUMENTS

JP  WO2016/154949 A1 * 3/2016 ............... H04L 9/32

* cited by examiner

*Primary Examiner* — Christian Chace
*Assistant Examiner* — Aaron C Smith
(74) *Attorney, Agent, or Firm* — Morgan, Lewis & Bockius LLP (57) ABSTRACT

In various embodiments, a safety system for an unmanned aerial vehicle (UAV) enables the safe operation of the UAV within an airspace by initiating various actions based on the position of the UAV relative to one or more flight zones and/or relative to other aircraft in the airspace.

20 Claims, 6 Drawing Sheets

METHODS OF SAFE OPERATION OF UNMANNED AERIAL VEHICLES

RELATED APPLICATIONS

This application claims the benefit of and priority to U.S. Provisional Patent Application No. 62/237,120, filed Oct. 5, 2015, the entire disclosure of which is hereby incorporated herein by reference.

TECHNICAL FIELD

In various embodiments, the present invention relates to the operation of unmanned aerial vehicles.

BACKGROUND

An unmanned aerial vehicle (UAV), commonly known as a drone or unmanned aerial system (UAS) and also referred to as a remotely piloted aircraft, is a flight vehicle without a human pilot aboard. Its path is controlled either autonomously by onboard computers or by the remote control of a pilot on the ground or in another vehicle. Drones have proliferated in number as recognition of their widespread and diverse commercial potential has increased. Numerous industries are embracing drones to improve or streamline day-to-day operations. In addition, a rapidly growing hobbyist community has been inspired by the marvel of owning technology previously accessible only to governments, national agencies, and film producers with creative special effects departments.

With the growing number of active drones, and new applications being imagined every day, legitimate concerns are being raised about risk to civil aviation as well as to lives and property should a drone inadvertently leave its pilot's control. Such a drone can continue flying until it runs out of power or strikes an obstacle, while being completely undetectable and invisible to manned aircraft and ground-based air-traffic control management systems. Currently available drones are not designed to communicate with other fixed or airborne civil aviation safety systems to avoid midair collisions. Thus, there is a need for improved systems and techniques for the safe operation of drones operated in airspace shared with other aircraft.

SUMMARY

Various embodiments of the present invention provide a platform that functions as a "drone virtual radar system" (DVRS) that may be integrated with existing drone designs and make these drones visible to civil aviation in the event of a drone flight-control malfunction, or when the drone poses a potential hazard to manned aircraft. At the same time, the DVRS offers drone operators additional layers of safety assurance through real-time traffic monitoring and automatic triggering of drone failsafe mechanisms. (The terms "UAV," "UAS," and "drone" are utilized interchangeably herein.)

In various embodiments, the DVRS and/or one or more components and/or functionalities thereof is integrated into a drone, for example, when the drone is assembled. In various embodiments, at least a portion of the DVRS is disposed within a stand-alone component that may be electrically and mechanically connected to a drone after the drone has been fabricated.

In various embodiments, the DVRS monitors, in real time, the state and velocity of the drone that it is installed on.

In addition, in various embodiments the DVRS advantageously avoids civil-aviation safety-system frequency congestion by ensuring that any broadcasts by the drone occur only when appropriate—i.e., when the drone presents a potential safety hazard to civil aviation. Thus, if the drone is equipped with safety oriented failsafe mechanisms, the DVRS may trigger one or more thereof if the drone leaves a predetermined flight zone (e.g., the bounds established by the drone operator and/or by government regulations).

If the drone is not equipped with any safety-oriented failsafe mechanisms, or these mechanisms have failed to return the drone to its approved flight area (or disable the drone), the DVRS may, in various embodiments, initiate a collision alert (e.g., a radio broadcast such as an automatic dependent surveillance broadcast and an active interrogation and monitoring of traffic collision avoidance system (TCAS) frequencies) to continuously alert civil aviation aircraft and/or ground-based air traffic controllers to the drone state and velocity. In this manner, embodiments of the invention assure that the drone does not pose a safety hazard to civil aviation is by ensuring that the drone is fully visible to all civil aviation aircraft and ground-based air traffic control stations to allow civil aviation aircraft to maneuver away from the drone.

In various embodiments, the DVRS monitors in real time the state and velocity of the drone that it is installed on while simultaneously monitoring in real time all civil aviation aircraft in close proximity to the drone. In some cases, such as drone operator error, or special permissions given to the drone operator to operate the drone in close proximity to low flying civil aircraft, the DVRS may broadcast a collision alert when a civil aviation aircraft strays too close to the drone. In this manner, the DVRS alerts civil aviation aircraft and ground-based air traffic controllers to the drone state and velocity until the civil aviation aircraft has maneuvered away from the drone so that the drone no longer poses a safety hazard to the civil aircraft.

In additional embodiments, the DVRS enables multiple drones in proximity to each other to interconnect in a wireless ad hoc network. One of the drones in the network may be designated as the master node (or "master drone"), and in the event that a civil aircraft strays too close to the networked drones, the master drone may initiate a collision alert on behalf of the entire network, thereby assuring that civil aviation radio frequencies (e.g., the ADS-B and TCAS frequencies) are not saturated with multiple broadcasts from multiple drones in a tight formation.

In an aspect, embodiments of the invention feature a method of safely operating an unmanned aerial vehicle (UAV) within an airspace. A designated flight zone having an outer boundary is defined for the UAV within the airspace. A regulation-established flight zone having an outer boundary is defined for the UAV within the airspace. At least a portion of the outer boundary of the regulation-established flight zone extends beyond at least a portion of the outer boundary of the designated flight zone. A position of the UAV relative to the designated flight zone and relative to the regulation-established flight zone and a position of the UAV relative to other aircraft in at least a portion of the airspace are monitored (e.g., simultaneously monitored). At least one of (a) broadcasting a warning signal to the operator of the UAV, (b) initiating a failsafe protocol that removes the UAV from the airspace, or (c) broadcasting a collision alert from the UAV to at least one aircraft in the airspace is performed based on at least one of (i) the position of the UAV relative to the designated flight zone, (ii) the position of the UAV relative to the regulation-established flight zone, or (iii) the position of the UAV relative to aircraft in the airspace.

Embodiments of the invention may include one or more of the following in any of a variety of combinations. The failsafe protocol may include, consist essentially of, or consist of one or more of automatically routing the UAV back to an operator of the UAV or to another location, directing the UAV to descend and land, or activating a disabling mechanism for disabling the UAV. The disabling mechanism may include, consist essentially of, or consist of a kill switch and/or a parachute. The collision alert may be broadcast. The collision alert may include, consist essentially of, or consist of an automatic dependent surveillance-broadcast (ADS-B) transmission and/or a traffic collision avoidance system (TCAS) transmission. A range of the collision alert may be controlled to be sufficient to be received only by aircraft within a predetermined distance from the UAV. Controlling the range of the collision alert may include, consist essentially of, or consist of limiting a power of the ADS-B transmission and/or a power of the TCAS transmission. The regulation-established flight zone may be defined based at least in part on one or more rules. The one or more rules may include, consist essentially of, or consist of one or more of a received sectional aeronautical chart, a received temporary flight restriction, or a government (e.g., Federal Aviation Administration) regulation. At least one of the rules may be received by the UAV when the UAV is powered up and/or via a cellular network. The outer boundary of the designated flight zone may be updated at least once during operation of the UAV based at least in part on a revised flight restriction.

The failsafe protocol may be initiated when an aircraft enters the designated flight zone irrespective of the position of the UAV within the airspace. The failsafe protocol may be initiated when an aircraft enters the regulation-established flight zone irrespective of the position of the UAV within the airspace. When an aircraft enters the regulation-established flight zone, the collision alert may be broadcast from the UAV at least to the aircraft irrespective of the position of the UAV within the airspace. When an aircraft enters the designated flight zone, the collision alert may be broadcast from the UAV at least to the aircraft irrespective of the position of the UAV within the airspace. The failsafe protocol may be initiated when the UAV leaves the designated flight zone irrespective of the position of any other aircraft within the airspace. The failsafe protocol may be initiated when the UAV leaves the regulation-established flight zone irrespective of the position of any other aircraft within the airspace. A disabling mechanism for disabling the UAV may be activated when the UAV leaves the designated flight zone irrespective of the position of any other aircraft within the airspace. A disabling mechanism for disabling the UAV may be activated when the UAV leaves the regulation-established flight zone irrespective of the position of any other aircraft within the airspace. The disabling mechanism may include, consist essentially of, or consist of a kill switch and/or a parachute.

When a distance between the UAV and an aircraft within the airspace decreases below a first threshold distance, the collision alert may be broadcast from the UAV at least to the aircraft irrespective of the position of the UAV within the airspace. When the distance between the UAV and the aircraft decreases below a second threshold distance smaller than the first threshold distance, the failsafe protocol may be initiated irrespective of the position of the UAV within the airspace. The collision alert may be broadcast from the UAV only if (i) a distance between the UAV and an aircraft within the airspace decreases below a first threshold distance, or (ii) an aircraft enters the regulation-established flight zone, or (iii) the UAV leaves the designated flight zone. The collision alert may be broadcast from the UAV only if (i) a distance between the UAV and an aircraft within the airspace decreases below a first threshold distance, or (ii) an aircraft enters the regulation-established flight zone.

In another aspect, embodiments of the invention feature a method of establishing communication between a plurality of unmanned aerial vehicles (UAVs) operating within an airspace and an aircraft within the airspace. A wireless ad hoc network is established among the plurality of UAVs. A first UAV is selected as a master node in the network. A collision alert is broadcast from only the first UAV when a distance between the aircraft and any one of the UAVs decreases below a first threshold distance.

Embodiments of the invention may include one or more of the following in any of a variety of combinations. The collision alert may be broadcast from the first UAV when the distance between the aircraft and the first UAV decreases below the first threshold distance. The collision alert may be broadcast from the first UAV when the distance between the aircraft and a second UAV different from the first UAV decreases below the first threshold distance. UAVs other than the first UAV may be designated as slave nodes in the network. The collision alert may include, consist essentially of, or consist of an automatic dependent surveillance-broadcast (ADS-B) transmission and/or a traffic collision avoidance system (TCAS) transmission. A range of the collision alert may be controlled to be sufficient to be received only by the aircraft. Controlling the range of the collision alert may include, consist essentially of, or consist of limiting a power of the ADS-B transmission and/or a power of the TCAS transmission. The first UAV may be selected as the master node in the network based at least in part upon proximity of the first UAV to the aircraft (e.g., the first UAV may be the closest of the UAVs to the aircraft). The first UAV may be selected as the master node in the network based at least in part upon the size of the first UAV, the transmitter power of the first UAV, and/or the power reserve level of the first UAV. For example, the first UAV may be the largest UAV in the network, the UAV in the network having the most transmitter power, and/or the UAV having the largest power reserve level in the network. At least one UAV in the network other than the first UAV may lack capability to broadcast the collision alert. For example, the transmitter or transceiver utilized to broadcast the collision alert may be absent, damaged, or otherwise nonfunctional. A second UAV different from the first UAV may be selected as the master node in the network, and the first UAV may be designated as a slave node in the network. The selection of the second UAV may be based at least in part on a change in distance between the aircraft and at least one UAV in the network (e.g., the first UAV or the second UAV). For example, the second UAV may become closer to the aircraft than the first UAV based upon movement of the first UAV, the second UAV, and/or the aircraft. The collision alert may be broadcast to the aircraft only with the second UAV after the second UAV is selected as the master node in the network. Two or more, or even all, of the UAVs in the network may be under control of a common operator. At least two of the UAVs in the network may be controlled by different operators. Establishing the wireless ad hoc network among the plurality of UAVs may include, consist essentially of, or consist of detection, by at least one UAV, of one or more UAVs proximate the at least one UAV, and initiation of a bi-directional wireless communication link between the at least one UAV and at least one of the one or more UAVs.

In yet another aspect, embodiments of the invention feature a method of safely operating an unmanned aerial vehicle (UAV) within an airspace. A designated flight zone having an outer boundary is defined for the UAV within the airspace. A regulation-established flight zone having an outer boundary is defined for the UAV within the airspace. At least portion of the outer boundary of the regulation-established flight zone extends beyond at least a portion of the outer boundary of the designated flight zone. The outer boundary of the regulation-established flight zone is updated at least once during operation of the UAV.

Embodiments of the invention may include one or more of the following in any of a variety of combinations. The regulation-established flight zone may be defined based at least in part on a received aeronautical chart (e.g., a received sectional aeronautical chart) and/or a received flight restriction (e.g., a received temporary flight restriction). The aeronautical chart and/or the flight restriction may be received by the UAV when the UAV is powered up and/or via a cellular network. The outer boundary of the regulation-established flight zone may be updated based on a revised flight restriction. The outer boundary of the designated flight zone may be updated based at least in part on the updated outer boundary of the regulation-established flight zone.

After updating the outer boundary of the regulation-established flight zone and/or after updating the outer boundary of the regulation-established flight zone, one or more of broadcasting a warning signal to the operator of the UAV, initiating a failsafe protocol that removes the UAV from the airspace, or broadcasting a collision alert from the UAV may be performed based on (i) the position of the UAV relative to the designated flight zone, and/or (ii) the position of the UAV relative to the regulation-established flight zone. The failsafe protocol may include, consist essentially of, or consist of one or more of automatically routing the UAV back to an operator of the UAV or to another location, directing the UAV to descend and land, or activating a disabling mechanism for disabling the UAV. The disabling mechanism may include, consist essentially of, or consist of a kill switch and/or a parachute. The collision alert may be broadcast. The collision alert may include, consist essentially of, or consist of an automatic dependent surveillance-broadcast (ADS-B) transmission and/or a traffic collision avoidance system (TCAS) transmission. A range of the collision alert may be controlled to be sufficient to be received only by aircraft within a predetermined distance from the UAV. Controlling the range of the collision alert may include, consist essentially of, or consist of limiting a power of the ADS-B transmission and/or a power of the TCAS transmission.

In another aspect, embodiments of the invention feature a safety system for an unmanned aerial vehicle (UAV) operable within an airspace. The system may include, consist essentially of, or consist of a computer processor, a memory, one or more sensors for sensing a position of the UAV, a velocity of the UAV, and/or a heading of the UAV, a hybrid surveillance module for monitoring radio transmissions from aircraft in proximity to the UAV, a plurality of radio transceivers each operating on a different frequency, and a failsafe trigger module for operating a disabling mechanism configured to disable the UAV during operation thereof.

Embodiments of the invention may include one or more of the following in any of a variety of combinations. The one or more sensors may include, consist essentially of, or consist of a global positioning system unit, a camera (and/or other optical sensor such as a CCD array or photodiode), and/or an inertial measurement unit (which may include, consist essentially of, or consist of, e.g., one or more accelerometers, one or more gyroscopes, and/or one or more magnetometers). The plurality of radio transceivers may include an automatic dependent surveillance-broadcast (ADS-B) transceiver (which may operate at a frequency of, e.g., approximately 1090 MHz), a second ADS-B transceiver (which may operate at a frequency of, e.g., approximately 978 MHz), and/or a traffic collision avoidance system (TCAS) transceiver (which may operate at a frequency of, e.g., approximately 1030 MHz). The plurality of radio transceivers may include a cellular radio transceiver, a VHF radio transceiver (which may operate at, e.g., one or more frequencies between approximately 30 MHz and approximately 300 MHz), a UHF radio transceiver (which may operate at, e.g., one or more frequencies between approximately 300 MHz and approximately 3000 MHz), and/or a data link for communicating with other UAVs. The data link may operate at a frequency of approximately 2.4 GHz and/or at one or more other cellular-communications frequencies. The disabling mechanism may include, consist essentially of, or consist of a kill switch and/or a parachute. The disabling mechanism may be a component of the UAV, and the system may merely interface with and operate the disabling mechanism. The disabling system may be a component of the safety system.

The computer processor may be configured to store, within the memory, (i) an outer boundary of a designated flight zone, and (ii) an outer boundary of a regulation-established flight zone. At least a portion of the outer boundary of the regulation-established flight zone may extend farther from the UAV than at least a portion of the outer boundary of the designated flight zone. The computer processor may be configured to determine, based at least in part on signals received from the one or more sensors and/or the hybrid surveillance module, (i) a position of the UAV relative to the designated flight zone and to the regulation-established flight zone, and/or (ii) a position of the UAV relative to other aircraft in at least a portion of the airspace. The computer processor may be configured to, based on (i) the position of the UAV relative to the designated flight zone, (ii) the position of the UAV relative to the regulation-established flight zone, and/or (iii) the position of the UAV relative to aircraft in the airspace, at least one of: (a) broadcast a warning signal to the operator of the UAV, (b) initiate a failsafe protocol that removes the UAV from the airspace, or (c) broadcast a collision alert from the UAV to at least one aircraft in the airspace. The computer processor may be configured to update the outer boundary of the designated flight zone and/or the outer boundary of the regulation-established flight zone before, after, and/or during operation of the UAV. The computer processor may be configured to (i) update the outer boundary of the regulation-established flight zone, and (ii) based at least in part on the updated outer boundary of the regulation-established flight zone, update the outer boundary of the designated flight zone. The computer processor may be configured to update the outer boundary of the designated flight zone and/or the outer boundary of the regulation-established flight zone during operation of the UAV based on (i) a received aeronautical chart and/or (ii) a received flight restriction. The computer processor may be configured to (i) form a wireless ad hoc network with one or more other UAVs, and (ii) only broadcast collision alerts to other aircraft within the airspace if the UAV is designated as the master node in the wireless ad hoc network. If the UAV is designated as a slave node in the wireless ad hoc network (or otherwise not designated as the master node in the wireless ad hoc network), the computer processor may be configured to not broadcast collision alerts from the UAV, at least while the UAV is in the wireless ad hoc network, irrespective of the position of the UAV within the airspace and/or the position of another aircraft within the airspace.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
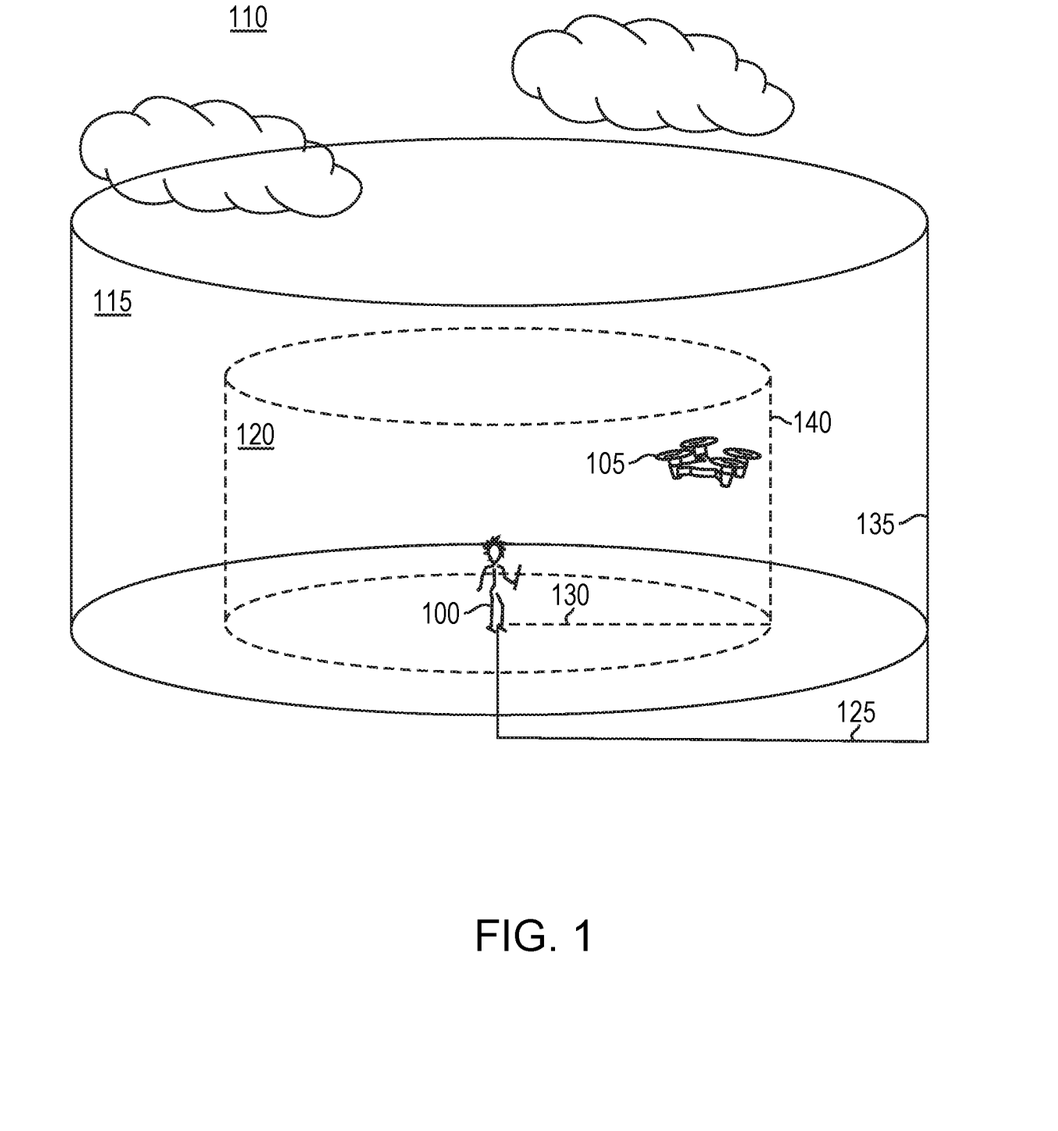
FIG. 1 is a schematic diagram of an airspace for drone operation in which multiple flight zones have been defined in accordance with various embodiments of the present invention.

In various embodiments, the DVRS enables the safe operation of the drone on which it is installed by monitoring the position of the drone relative to one or more flight zones defined within the surrounding airspace and triggering various actions based at least on the drone's position. The DVRS may also monitor the position of other aircraft and/or drones within such boundaries and trigger actions based thereon. FIG. 1 depicts an exemplary embodiment of the invention in which a drone operator (or simply "operator") 100 is operating a drone 105 within an airspace 110. As shown, multiple different flight zones are defined within the airspace in accordance with embodiments of the present invention. In various embodiments, these flight zones include a regulation-established flight zone 115 and a designated flight zone 120. The regulation-established flight zone 115 and designated flight zone 120 may have outer boundaries, as shown, and in typical embodiments the designated flight zone 120 will be disposed within the regulation-established flight zone 115; that is, the outer boundary of the designated flight zone 120 will be disposed entirely within (or, in some embodiments and/or portions of the boundary, substantially coextensive with) the regulation-established flight zone 115. In other embodiments, the outer boundaries of the regulation-established flight zone 115 and designated flight zone 120 may overlap at one or more points, but at least a portion of the outer boundary of the designated flight zone 120 is disposed within the regulation-established flight zone 115. The outer boundaries of the regulation-established flight zone 115 and designated flight zone 120 may have any shape and may change or be updated over time. In the embodiment depicted in FIG. 1, the regulation-established flight zone 115 and designated flight zone 120 are substantially cylindrical and are therefore defined by radial distances 125, 130 and heights (e.g., above ground level) 135, 140.

The regulation-established flight zone 115 may correspond to the portion of the airspace 110 in which the drone 105 is legally permitted to function. Thus, in various embodiments, the regulation-established flight zone 115 is defined based at least in part on, for example, one or more regulations (e.g., government regulations) for the operation of drone 105 and which may depend at least in part on one or more characteristics of the drone 105 itself (e.g., size, capabilities, etc.). The regulations may also depend upon the particular location of the airspace 110 and, e.g., buildings or other structures within or near the airspace 110. For example, the regulation-established flight zone 115 may be defined, at least in part, based on one or more regulations issued by the Federal Aviation Administration (see, e.g., https://www.faa.gov/regulations_policies/faa_regulations/).

In various embodiments, the regulation-established flight zone 115 may be defined, at least in part, based on one or more other rules, such as sectional aeronautical charts of the airspace and/or one or more temporary flight restrictions issued for the airspace, in addition to or instead of the one or more regulations. The rules defining the regulation-established flight zone 115 may be received by the drone 105 and/or operator 100 before and/or during the flight of the drone 105; thus, the outer boundary of the regulation-established flight zone 115 may be dynamically altered during the flight of the drone 105. For example, one or more of the rules may be received by the drone 105 over a local cellular communications network during or after the drone 105 is powered up prior to flight.

The designated flight zone 120 may correspond to one or more portions of the airspace 110 designated for operation of the drone 105 by the operator 100. For example, portions or the entirety of the outer boundary of the designated flight zone 120 may correspond to the bounds of the line of sight of the operator 100, the distance beyond which the operator 100 determines may not allow safe operation of the drone 105, or one or more other factors. The outer boundaries of the designated flight zone 120 and the regulation-established flight zone 115 may be defined in terms of absolute position (e.g., latitudes and longitudes) and/or in terms of distance and height from the operator 100 or another point of reference. The outer boundary of the designated flight zone 120 may be altered before and/or during the flight of the drone 105 by the operator 100. For example, the operator 100 and/or the drone 105 may receive an updated or temporary flight restriction, and the outer boundary of the designated flight zone 120 may be altered to exclude one or more portions of the airspace forbidden thereby. In embodiments in which the outer boundary of the regulation-established flight zone 115 is updated during flight of the drone 105 based on a received rule (e.g., a received sectional aeronautical chart and/or a received temporary flight restriction), the outer boundary of the designated flight zone 120 may be updated based at least in part on the updated outer boundary of the regulation-established flight zone 115. For example, the outer boundary (or a portion thereof) of the designated flight zone 120 may be expanded or contracted to remain within the revised outer boundary of the regulation-established flight zone 115.

Figure 2:
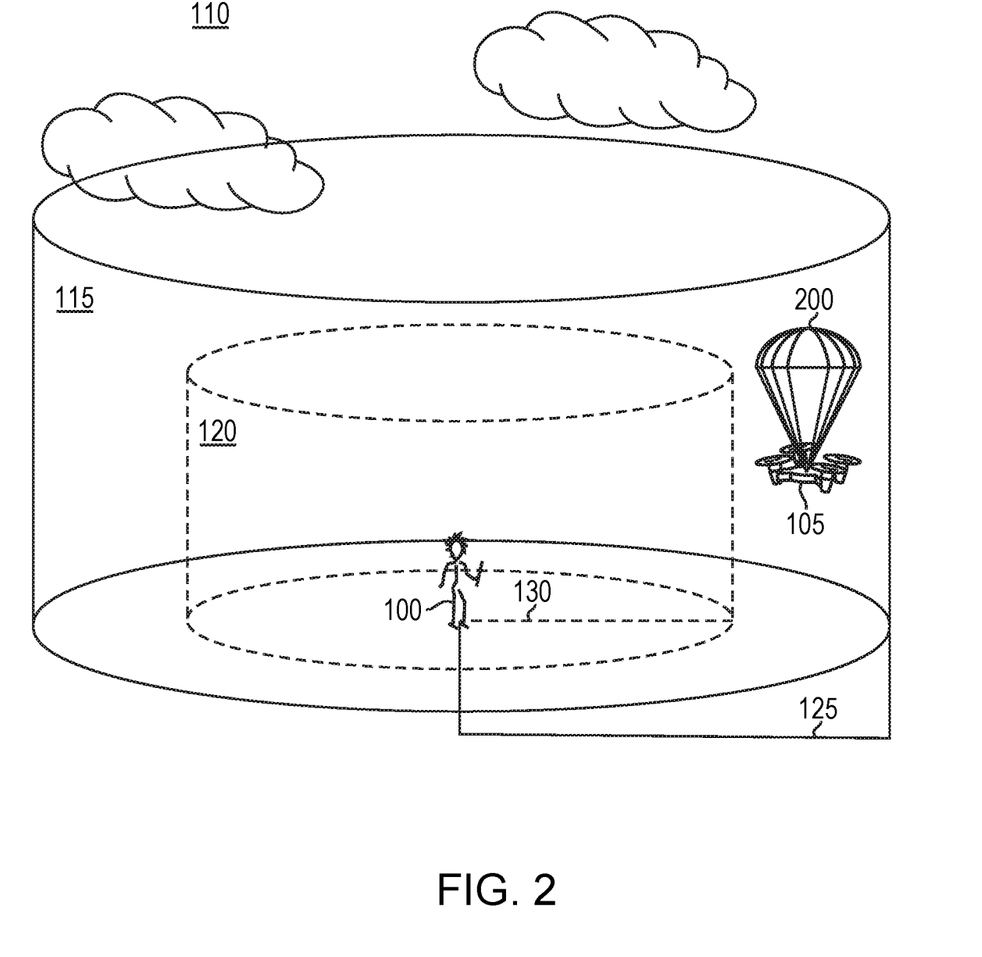
FIG. 2 is a schematic diagram of a drone initiating a failsafe protocol after crossing the outer boundary of a designated flight zone in accordance with various embodiments of the present invention.

In accordance with embodiments of the invention, the position of the drone 105 relative to the designated flight zone 120 and the regulation-established flight zone 115 (e.g., relative to the outer boundaries thereof) is monitored, and one or more actions may be taken in the event that the drone 105 strays from its intended portion of the airspace 110. For example, if the drone 105 crosses the outer boundary of the designated flight zone 120, one or more actions may be taken, e.g., prior to the drone 105 reaching the outer boundary of the regulation-established flight zone 115. For example, the control system of the drone 105 may broadcast a warning signal to the operator 100 (and/or another recipient) and/or initiate one or more failsafe protocols. In various embodiments, failsafe protocols may include, consist essentially of, or consist of automatically routing the drone 105 back to the operator 100, directing the drone 105 to descend to ground level and land, or activating one or more disabling mechanisms for disabling the drone 105 and thus removing it from the airspace 110. For example, as shown in FIG. 2, the disabling mechanism may include, consist essentially of, or consist of a kill switch that stops the propulsion system (e.g., one or more propellers and/or engines) of the drone 105 and/or a parachute that slows the descent of the disabled drone 105 and hopefully limits any damage thereto resulting from such a forced landing.

Figure 3:
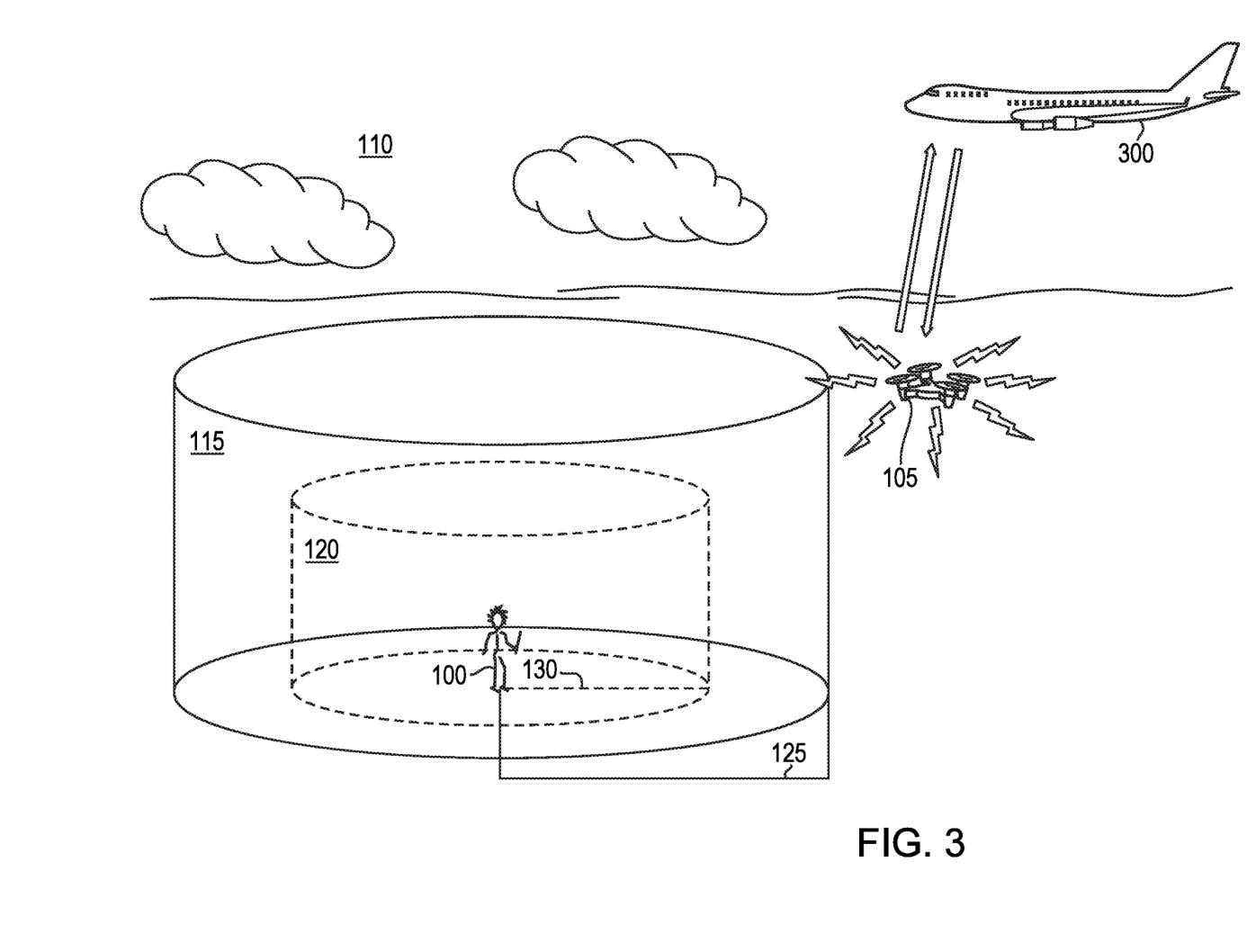
FIG. 3 is a schematic diagram of a drone initiating a collision alert after crossing the outer boundary of a regulation-established flight zone in accordance with various embodiments of the present invention.

In various embodiments of the invention, the drone 105 may not have such failsafe protocols and/or disabling mechanisms, or the failsafe protocol and/or disabling mechanism fails to operate and/or fails to return the drone 105 to the designated flight zone 120 or remove the drone 105 from the airspace 110. In such embodiments, the drone 105 may broadcast a collision alert so that other aircraft 110 and/or ground-based air traffic controllers are aware of the position, velocity, and/or heading of the drone 105 and thereby avoid approaching or colliding with drone 105. For example, the collision alert may include, consist essentially of, or consist of an automatic dependent surveillance-broadcast (ADS-B) transmission and/or a traffic collision avoidance system (TCAS) transmission. As shown in FIG. 3, the collision alert may alert aircraft 300 within airspace 110 to the presence of drone 105 and enable the aircraft 300 to avoid approaching or colliding therewith.

As known to those of skill in the art, TCAS is an aircraft collision avoidance system designed to reduce the incidence of collisions between aircraft. TCAS monitors the airspace around an aircraft for other aircraft equipped with a corresponding active transponder, independent of air traffic control, and warns pilots or operators of the presence of other transponder-equipped aircraft that may present a threat of mid-air collision. For example, see "Introduction to TCAS II Version 7.1," published by the Federal Aviation Administration on Feb. 28, 2011, the entire disclosure of which is incorporated by reference herein. TCAS transponders and transceivers are conventional and may be procured or assembled without undue experimentation.

Similarly, ADS-B is a surveillance technology in which an aircraft determines its position via satellite navigation and periodically broadcasts it, thereby enabling tracking of the aircraft. The ADS-B information may be received by air traffic control ground stations and/or by other aircraft. For example, see "Automatic Dependent Surveillance-broadcast (ADS-B) Out Performance Broadcast Requirements to Support Air Traffic Control (ATC) Service," 14 CFR Part 91, Federal Aviation Administration, May 28, 2010, the entire disclosure of which is incorporated by reference herein. ABS-B transceivers and other equipment are conventional and may be procured or assembled without undue experimentation.

Various embodiments of the present invention thus avoid broadcasting collision alerts from drone 105 unless and until the drone 105 has broached the outer boundary of a flight zone and/or one or more failsafe protocols are absent or have failed to initiate. This advantageously avoids the flooding of various aviation frequencies with constant transmissions from drone 105 even when drone 105 is not a potential safety hazard. In addition, the transmission range of the collision alert may be controlled to be sufficient to be received only by aircraft and/or ground-based air traffic controllers within a predetermined distance from the drone 105. For example, the power of the collision alert transmission may be limited such that the alert is only receivable within the predetermined distance. In this manner, aviation frequencies at distances farther from drone 105, e.g., where drone 105 is unlikely to pose a safety hazard, are not flooded with collision alerts from drone 105.

Figure 4:
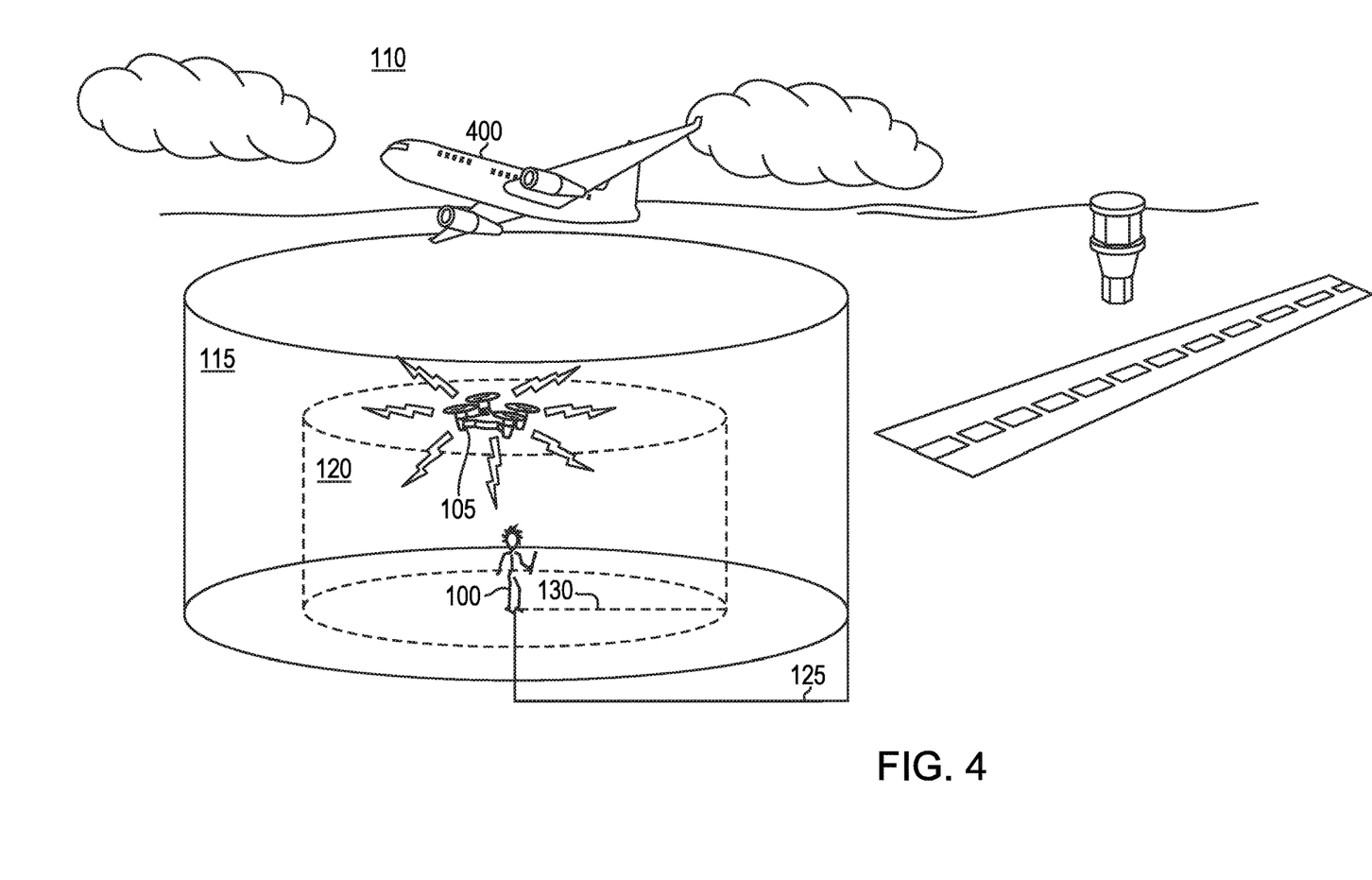
FIG. 4 is a schematic diagram of a drone initiating a collision alert based on the distance between the drone and another aircraft in accordance with various embodiments of the present invention.

In various embodiments of the invention, the drone 105 monitors the positions of aircraft within the airspace 110 and initiates one or more of various actions based on the position of an aircraft and/or the distance between an aircraft and the drone 105 even if, for example, the drone 105 is being otherwise safely operated within its designated flight zone 120. For example, the drone 105 may monitor aviation frequencies for, e.g., ADS-B and/or TCAS broadcasts from or about other aircraft to determine their positions within the airspace 110. Upon detection of another aircraft, or when the aircraft approaches the drone 105, one or more actions may be initiated. For example, a warning signal may be broadcast to the operator 100 (and/or to another recipient), a failsafe protocol on drone 105 (e.g., a disabling mechanism) may be initiated, and/or the drone 105 may broadcast a collision alert. In various embodiments, as shown in FIG. 4, the drone 105 initiates a collision broadcast when an aircraft 400 enters the regulation-established flight zone 115 irrespective of the position of the drone 105 within the airspace 110. In addition, in various embodiments, the drone 105 may initiate a failsafe protocol when the aircraft 400 enters the designated flight zone 120 irrespective of the position of the drone 105 within the airspace 110.

In various embodiments, one or more actions are initiated by the drone 105 based on the relative positions of the drone 105 and the aircraft 400 instead of or in addition to actions initiated based on the position of the aircraft 400. For example, the drone 105 may broadcast a collision alert when the distance between the drone 105 and the aircraft 400 decreases below a first threshold distance, even if the aircraft 400 has not yet entered the designated flight zone 120 or the regulation-established flight zone 115. In addition or instead, the drone 105 may initiate a failsafe protocol (e.g., a disabling mechanism) when the distance between the drone 105 and the aircraft 400 decreases below a second threshold distance (which may be smaller than the first threshold distance), irrespective of the position of aircraft 400 relative to the outer boundaries of the designated flight zone 120 or the regulation-established flight zone 115.

In various embodiments of the invention, the drone 105 may monitor the position of one or more other drones within airspace 110 (e.g., within regulation-established flight zone and/or designated flight zone 120) and initiate one or more actions based on the positions of such drones and/or the relative distance between drone 105 and one or more other drones. Such actions may be the same as those described above for drone 105 relative to aircraft 300, 400, or one or more of the actions may be different. For example, the drone 105 may communicate with one or more other drones (e.g., on a non-civilian aviation frequency) to determine the positions thereof, and the drone 105 may change course to avoid approaching or colliding with such drones prior to or instead of initiating a failsafe protocol (e.g., a disabling mechanism or a directive to land).

Figure 5:
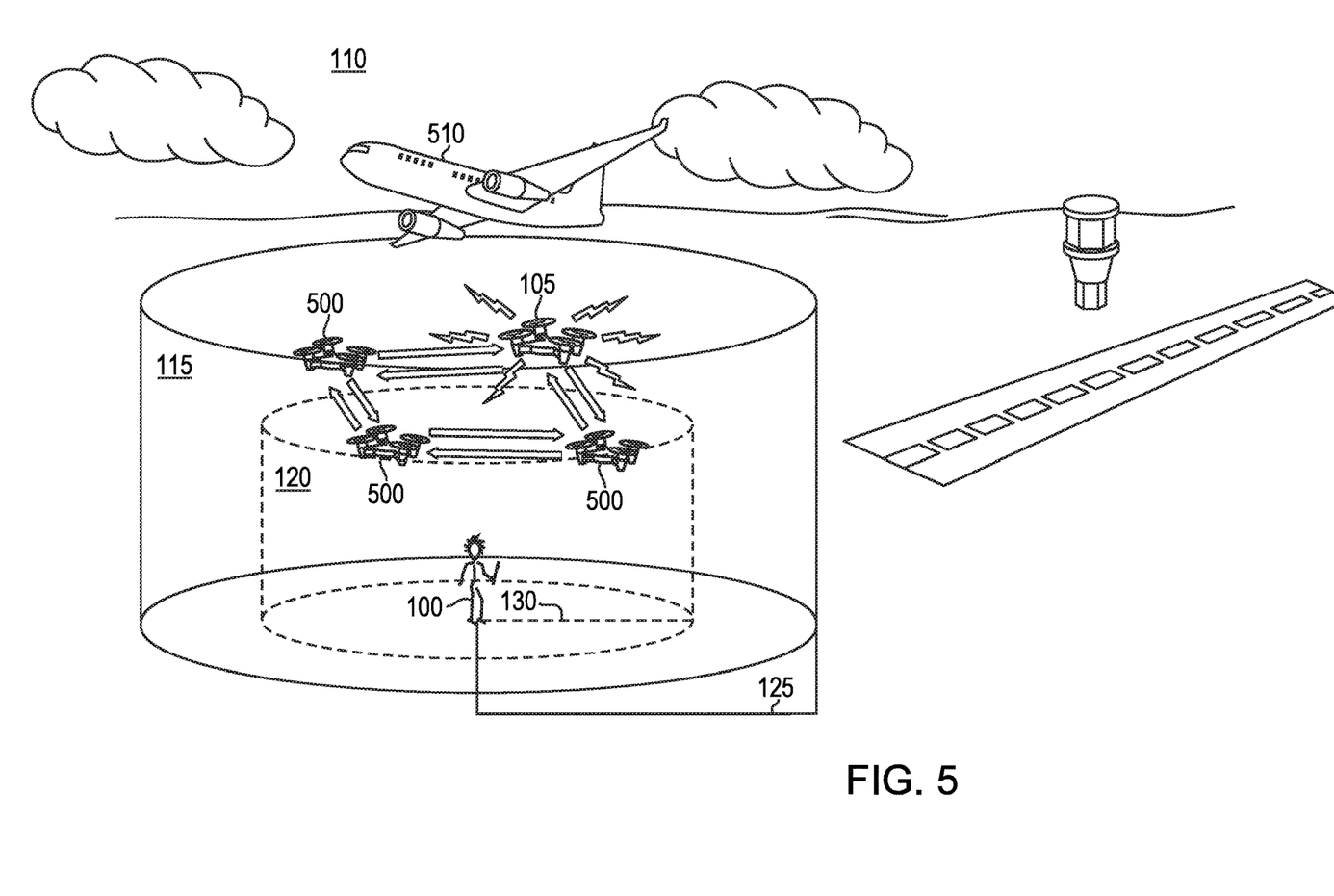
FIG. 5 is a schematic diagram of multiple drones forming a wireless ad hoc network and initiating a collision alert from a master drone based on the distance between one or more of the drones and another aircraft in accordance with various embodiments of the present invention.

Various embodiments of the present invention enable the safe operation of a group of drones within airspace 110, one or more of the drones equipped with DVRS, in the event of an approach of another aircraft without each of the drones broadcasting its own collision alert, as multiple such collision alerts may cause confusion or flood the broadcast frequency. As shown in FIG. 5, drone 105 may be operating within airspace 110 in proximity to one or more other drones 500 that are each also under control of operator 100 or under the control of another operator. In the event of an aircraft 510 entering a portion of the airspace 110 (e.g., the regulation-established flight zone 115 or the designated flight zone 120), communication may be established between only one of the drones (e.g., drone 105) and the aircraft 510 in order to alert the aircraft 510 regarding the presence of all of the drones 105, 500. For example, in various embodiments a wireless ad hoc network may be established among the drones 105, 500 (i.e., before or after the approach of aircraft 510), and one of the drones (e.g., drone 105) may be selected as the master node in the network. (While in the exemplary embodiments provided herein, drone 105 is designated as the master node, one of the drones 500 may be the master node, and/or the drone designated as the master node may change one or more times.) Drone 105, and only drone 105, may then broadcast a collision alert based on, e.g., the position of the aircraft 510 within the airspace 110 (e.g., relative to the regulation-established flight zone 115 or the designated flight zone 120) and/or the relative position between the aircraft 510 and one or more of the drones 105, 500. For example, each of the drones 105, 500 may support a simple database for containing positional information about the other drones, and in various embodiments, this database is actually used and updated only by the master drone. Positional information for each of the other (slave) drones may be expressed and stored in terms of a drone's distance from aircraft within the airspace 110 and/or distance from the mater drone. The master drone 105 may broadcast a collision alert if the distance between the aircraft 510 and any of the drones 105, 500 decreases below a threshold distance. In this manner, all of the drones 105, 500 may be operated safely even if one or more of the drones itself lacks the capability to broadcast the collision alert. In addition, broadcasting collision alerts from only one drone in the network assures that aviation (e.g., ADS-B and/or TCAS) frequencies are not saturated with multiple broadcasts from multiple drones in a tight formation.

In various embodiments, the wireless ad hoc network is established among the drones via detection, by at least one of the drones, of one or more other drones in the proximity. For example, one or more drones may be equipped with cameras or other sensors capable of detecting the presence of nearby drones, or the drones may broadcast short-range messages that, when received and responded to by another drone, indicate the proximity of the other drone. Once the other drone is detected, a bi-directional wireless communication link may be initiated between the drones to network the drones together. In various embodiments, drones communicate with each other on non-aviation radio frequencies in order to avoid congestion of the radio frequencies utilized by civil aviation (e.g., 1090 MHz, 978 MHz, and/or 1030 MHz). For example, each drone may send messages (or "pings") to other drones within range at periodic intervals (e.g., each second or fraction of a second) on a frequency not typically utilized by civil aviation or having a range shorter than typical civil aviation frequencies. For example, the drone may communicate on a 2.4 GHz frequency and/or another cellular communications frequency, which typically has a range limited to under two miles, in order to avoid congestion of other radio frequencies. In this manner, communications from the drones over typical civil aviation frequencies (e.g., 1090 MHz, 978 MHz, and/or 1030 MHz) that have much longer ranges (e.g., over 100 miles) may be limited only to collision alerts if one or more of the drones approaches or is approached by another aircraft.

Once the network is established, the drones may intercommunicate (e.g., wirelessly) as nodes of the network. If all drones are within range of each other, they may send messages (which may be in the form of data packets) over a fixed frequency using a wireless local area network or other suitable network arrangement in which each drone "multicasts" messages to all other drones in accordance with a communication protocol that allocates network time among the drones. An advanced routing protocol may be used to permit messages to reach all drones even though some are out of radio range of the message-originating drone; each drone may determine, for example by receiving position data from one or more drones, which drones are within its range and propagate received messages to neighboring drones in accordance with the protocol. Numerous schemes for routing messages across, for example, mesh networks are known and may be employed herein; these include AODV, BATMAN, Babel, DNVR, DSDV, DSR, HWMP, TORA and the 802.11x standards. More generally, the network may be a wired or wireless local area network (LAN), a wide area network (WAN), an intranet, the Internet, the public telephone infrastructure, or some combination. It should be stressed that any of numerous modes of network communication can be utilized, e.g., direct peer-to-peer protocols, client-server architectures utilizing periodic polling of each subsystem rather than explicit message transmission, or token-passing schemes.

Within the network of drones, the master drone (i.e., the master node of the network) may be selected based on any of various criteria. For example, a drone (e.g., drone 105) may be selected as the master drone if it is the closest drone to the aircraft 510. In other embodiments, the master drone may be selected based on, for example, the size of the drone (e.g., the largest drone may be selected), the transmitter power of the drone (e.g., the drone having the strongest radio transmitter may be selected), and/or the power supply (e.g., remaining fuel and/or battery power) of the drone (e.g., the drone having the largest remaining power supply may be selected). In other embodiments, the master drone is selected substantially randomly or is one of the first drones to establish the network. As mentioned above, one or more of the drones in the network may lack the capability to broadcast the collision alert, and such drones would typically not be selected as the master drone.

In various embodiments, the drone designated as the master drone changes based on any of a variety of different factors. For example, if the distance between the master drone and aircraft 510 changes such that another drone in the network is closer to the aircraft 510, then the new closer drone may be designated as the master drone and broadcast any necessary collision alerts, and the former master drone may be redesignated as a slave node in the network. Similarly, if the power reserves of the master drone are depleted to a threshold level, or if one or more systems (e.g., a radio transmitter) of the master drone fail, another drone within the network may be designated as the master drone.

Figure 6:
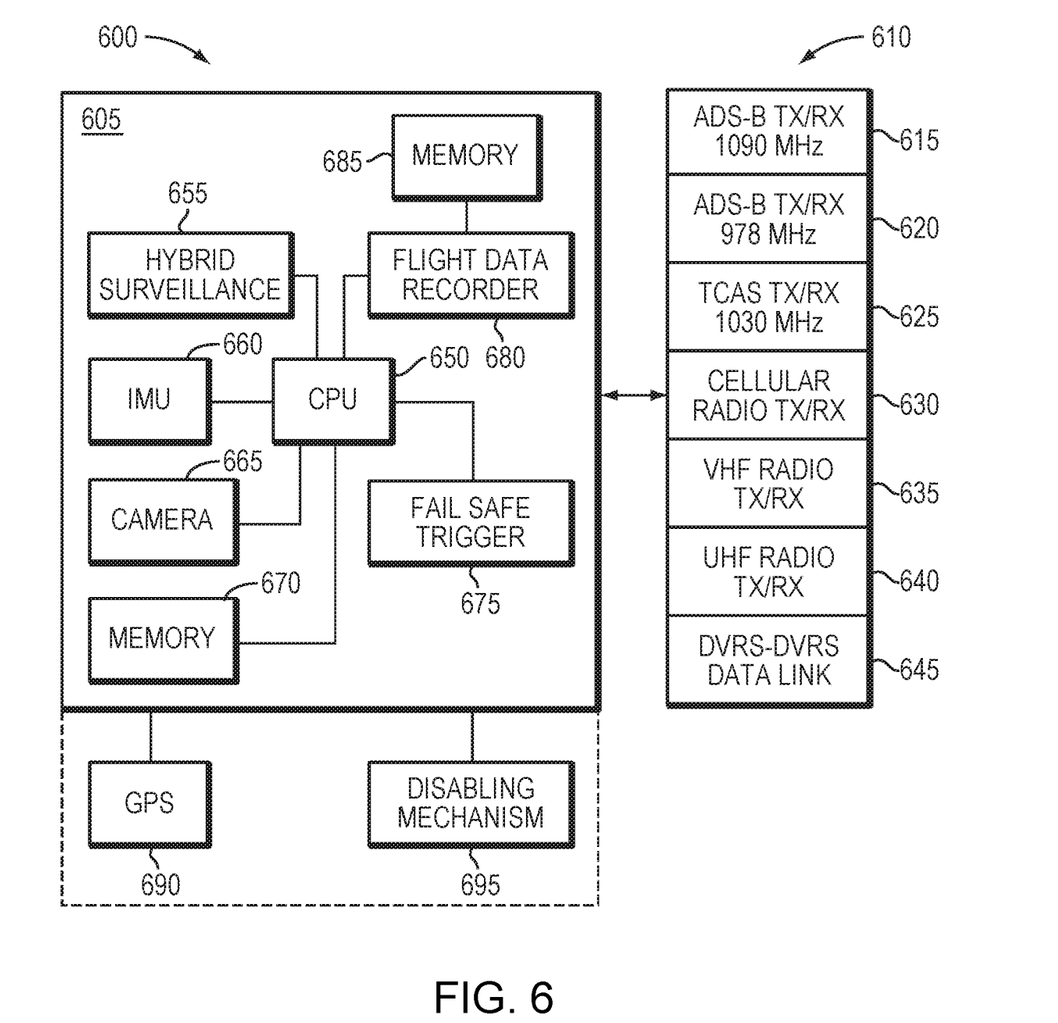
FIG. 6 is a block diagram of a drone virtual radar system in accordance with various embodiments of the present invention.

FIG. 6 is a block diagram illustrating basic components of a DVRS 600 in accordance with embodiments of the present invention. As shown, the DVRS 600 may include, consist essentially of, or consist of a system core 605 and a transceiver bank 610. In various embodiments, the system core 605 may communicate with the transceiver bank 610 via one or more hardware components such as field-programmable gate arrays (FPGAs). The transceiver bank 610 may include, consist essentially of, or consist of one or more wideband agile transceivers that are configured to monitor multiple civil aviation navigational aids and civil air traffic collision avoidance systems simultaneously. For example, as shown in FIG. 6, the transceiver bank 610 may feature one or more of transceivers 615, 620, 625 for monitoring of and communication on ADS-B and TCAS frequencies, as well as one or more of a transceiver 630 for monitoring of and communication on cellular radio frequencies, a transceiver 635 for monitoring of and communication on VHF radio frequencies, a transceiver 640 for monitoring of and communication on UHF radio frequencies, and a transceiver 645 for monitoring of and communication on one or more frequencies utilized by the DVRS 600 to communicate with other drones equipped with a DVRS and to form data links therewith. For example, the transceiver 645 may utilize one or more frequencies (e.g., 2.4 GHz or another cellular communications frequency) as described above to facilitate drone-to-drone communication and the establishment of wireless ad hoc networks between drones.

Transceiver 630 may monitor and utilize any of a variety of cellular communications frequencies, which in various embodiments are based on the geographic location in which the DVRS 600 is operating. For example, in the United States (and other locations in North America), such frequencies may range between approximately 800 MHz and approximately 2.4 GHz (e.g., approximately 800 MHz, approximately 1.9 GHz, or approximately 2.4 GHz); in Japan, such frequencies may range between approximately 800 MHz and approximately 1.5 GHz (e.g., approximately 800 MHz, approximately 1.5 GHz, approximately 1.8 GHz, approximately 2.1 GHz, or approximately 2.5 GHz); in Europe, such frequencies may range between approximately 380 MHz and 1.9 GHz (e.g., approximately 380 MHz, approximately 410 MHz, approximately 450 MHz, approximately 480 MHz, approximately 710 MHz, approximately 750 MHz, approximately 810 MHz, approximately 900 MHz, or approximately 1.9 GHz); in the Middle East, such frequencies may range between approximately 2.3 GHz and approximately 2.6 GHz (e.g., approximately 2.3 GHz or approximately 2.6 GHz); and in Australia, such frequencies may range between approximately 700 MHz and approximately 2.4 GHz (e.g., approximately 700 MHz, approximately 800 MHz, approximately 1.9 GHz, or approximately 2.4 GHz). These frequencies are merely exemplary, and embodiments of the invention may utilize other frequencies.

The system core 605 typically features a computer processor (or simply "processor") 650 and various other components operatively coupled to the processor 650. These components may include, consist essentially of, or consist of, for example, a hybrid surveillance module 655, an inertial measurement unit (IMU) 660, a camera 665, a memory 670, a failsafe trigger module 675, and/or a flight data recorder 680 (which may communicate with or have a dedicated memory 685). The hybrid surveillance module 655 may control one or more of the transceivers within the transceiver bank 610, e.g., initiate monitoring of and/or transmission (of, e.g., collision alerts) on specific frequencies therewith. The IMU 660 is utilized for inertial navigation, to determine the drone orientation, acceleration, velocity, and/or position. For example, the IMU 660 may include, consist essentially of, or consist of, for example, one or more conventional inertial navigation instruments such as accelerometers and/or gyroscopes.

The system core 605 and/or the processor 650 may also interface with one or more components that may be present on the drone independent of the DVRS 600. For example, as shown in FIG. 6, the system core 605 may communicate with and/or control one or more global positioning system (GPS) sensors 690 and/or one or more disabling mechanisms 695, e.g., a kill switch and/or a parachute. A kill switch disables the drone's propulsion system so that it falls back to earth. Typically, in order to avoid damage to the drone, the disabling mechanism 695 includes a parachute that is deployed when propulsion is disabled.

In other embodiments, such components are portions of the DVRS 600, as indicated by the dashed line in FIG. 6. The failsafe trigger module 675 may control the disabling mechanism 695 based on, for example, the position of the drone relative to one or more flight zones, the position of one or more other aircraft or drones relative to one or more flight zones, and/or the position or one or more other aircraft or drones relative to the drone.

In various embodiments, the processor 650 receives and analyzes inputs from multiple sensors, e.g., hybrid surveillance module 655, GPS sensor 690, IMU 660, and/or camera 665, to determine if the drone has strayed out of one or more flight zones in the surrounding airspace (as detailed above) and therefore poses a threat to civil aviation aircraft, and/or if a civil aviation aircraft is getting too close to the drone while the drone is still within its designated flight zone. Details (e.g., outer boundaries) of one or more flight zones may be stored within the memory 670 and updated based on information received via the transceiver bank 610, and the processor 650 may compare position information received from one or more sensors to such details to determine the position of the drone relative to the flight zone(s). The processor 650 may also compare flight zone information with position information of other drones and/or other aircraft in the airspace in order to initiate various actions, as detailed above.

In various embodiments, the processor 650 may execute algorithms disclosed (or similar to those disclosed) in "GPS/INS/Optic Flow Data Fusion for Position and Velocity estimation," International Conference on Unmanned Aircraft Systems (2013), the entire disclosure of which is incorporated by reference herein, to accurately determine the state and velocity of the drone using multiple sensors (e.g., GPS information, optical flow information acquired using the camera, and inertial navigation information acquired using the IMU). This information may be used to execute a decision algorithm; see, e.g., "UAS Safety: Unmanned Aerial Collision Avoidance System," IEEE Systems and Information Engineering Design Symposium (2006), the entire disclosure of which is incorporated by reference herein, to trigger failsafe protocols such as a return to home autopilot override, parachute, or kill switch to disable the drone based on the drone position relative to one or more flight zones, and/or to switch from passive (i.e., only monitoring) to active (i.e., monitoring and transmitting, e.g., collision alerts) hybrid surveillance. In various embodiments, in the event that a civil aircraft is detected in close proximity to the drone, the processor 650 may execute a combination of the algorithms described in "Moving Obstacle Avoidance for Unmanned Aerial Vehicles," 69th American Helicopter Society Forum (2013) and "Sense and Avoid for Unmanned Aerial Vehicles Using ADS-B," IEEE International Conference on Robotics and Automation (2015), or Markov decision processes (see, e.g., "Unmanned Aircraft Collision Avoidance Using Partially Observable Markov Decision Processes," Lincoln Laboratory Project Report ATC-356 (2009)) to track the civil aircraft and predict if it is on a flight path that could potentially cause a conflict with the drone. The entire disclosures of the references cited in this paragraph are hereby incorporated by reference in their entireties.

In various embodiments, the processor 650 determines if the drone has strayed out of one or more flight zones, or if a civil-aviation aircraft is getting too close to the drone while the drone is still within one or more flight zones based on one or more sensors (e.g., GPS 690, hybrid surveillance module 655, camera 665, and/or IMU 660). The GPS 690 detects Global Positioning System satellite signals to determine the position of the drone, while the agile transceivers of the transceiver block 610 may be used to lock onto civil aviation navigational aids such as radio beacons, e.g., VHF omnidirectional range (VOR) and/or distance measuring equipment (DME). The transceivers may also be utilized to communicate with the cellular network to triangulate the drone's position. In various embodiments, this allows the DVRS 600 to be more resistant to GPS spoofing or drone position hijacking, and also enables the DVRS 600 to determine drone position in environments where receipt of GPS signals is intermittent or impossible. The hybrid surveillance module 655 passively monitors civil aviation activity in proximity to the drone (e.g., over ADS-B and/or TCAS frequencies). If needed, the processor 650 utilizes the inputs from any one or more of these sensors to switch from passive to active surveillance by configuring one or more of the agile transceivers to begin broadcasting a collision alert. For example, the collision alert may include, consist essentially of, or consist of the drone state (e.g., position) and velocity to be seen by civil aviation aircraft and/or ground-based air-traffic controllers.

As detailed above, in the event that a civil aircraft strays too close to a formation of drones (at least one of which is equipped with DVRS), the DVRS data link 645 may be used to coordinate with other DVRS (or similar) systems to designate a master drone that may initiate collision alert and actively interrogate and monitor civil aviation (e.g., TCAS) frequencies to avoid civil-aviation system frequency overload.

The DVRS 600 may internally store a database representative of sectional aeronautical information such as civil aviation navigational aid specifications, and any flight restriction information in the region of operation in memory 670. This database may automatically update using cellular radio frequency upon system power up, or in real time during operation.

In various embodiments, the DVRS internally records all the data regarding the state and velocity of the drone that it is installed on in the manner of a "black box" via the flight data recorder 680. The DVRS 600 may also record all civil aviation traffic and/or all other DVRS-equipped drone traffic in proximity to the drone. This information may thus be available to aviation safety and accident investigators in the event of an incident involving the drone.

The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The processor 650 that executes commands and instructions may be a general purpose computer, but may utilize any of a wide variety of other technologies including a programmed microprocessor, micro-controller, peripheral integrated circuit element, a CSIC (customer-specific integrated circuit), ASIC (application-specific integrated circuit), a logic circuit, a digital signal processor, a programmable logic device, such as an FPGA (field-programmable gate array), PLD (programmable logic device), PLA (programmable logic array), smart chip, or any other device or arrangement of devices that is capable of implementing the functionality described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, etc.) used to provide machine instructions and/or data to a programmable processor, including a machine-readable medium that receives machine instructions as a machine-readable signal. The term "machine-readable signal" refers to any signal used to provide machine instructions and/or data to a programmable processor.

The memory components described above may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the UNIX operating system, the LINUX operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functionality described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of safe operation, by an operator, of an unmanned aerial vehicle (UAV) within an airspace, the method comprising:
    defining, by the operator, for the UAV within the airspace, a designated flight zone having an outer boundary;
    defining, for the UAV within the airspace, a regulation-established flight zone having an outer boundary, wherein the outer boundary of the designated flight zone is disposed entirely within the outer boundary of the regulation-established flight zone;
    simultaneously monitoring (i) a position of the UAV relative to the designated flight zone and relative to the regulation-established flight zone, and (ii) a position of the UAV relative to other aircraft in at least a portion of the airspace;
    when an aircraft enters the regulation-established flight zone, broadcasting a collision alert from the UAV to the aircraft even when the UAV is within the designated flight zone; and
    initiating a failsafe protocol at the UAV when the aircraft enters the designated flight zone even when the UAV is within the designated flight zone.

2. The method of claim 1, wherein the failsafe protocol comprises one or more of:
    automatically routing the UAV back to the operator of the UAV;
    directing the UAV to descend and land; or
    activating a disabling mechanism for disabling the UAV.

3. The method of claim 2, wherein the disabling mechanism comprises at least one of a kill switch or a parachute.

4. The method of claim 1, wherein the collision alert comprises at least one of:
    an automatic dependent surveillance-broadcast (ADS-B) transmission; or
    a traffic collision avoidance system (TCAS) transmission.

5. The method of claim 4, further comprising decreasing a range, from the UAV, of the collision alert to be sufficient to be received only by the aircraft even when one or more other aircraft are present within the airspace.

6. The method of claim 5, wherein decreasing the range of the collision alert comprises decreasing at least one of a power of the ADS-B transmission or a power of the TCAS transmission to decrease the range of the collision alert.

7. The method of claim 1, wherein the regulation-established flight zone is defined based at least in part on a rule comprising at least one of:
    a received sectional aeronautical chart;
    a received temporary flight restriction; or
    a Federal Aviation Administration regulation.

8. The method of claim 7, wherein the rule is received by the UAV when power is initially supplied to the UAV.

9. The method of claim 7, wherein the rule is received by the UAV via a cellular network.

10. The method of claim 1, further comprising updating the outer boundary of the designated flight zone at least once during operation of the UAV based at least in part on a revised flight restriction received by the operator during operation of the UAV.

11. The method of claim 1, wherein the failsafe protocol is initiated when the UAV leaves the designated flight zone even when no other aircraft are within the designated flight zone or the regulation-established flight zone.

12. The method of claim 1, wherein a disabling mechanism for disabling the UAV is activated when the UAV leaves the designated flight zone even when no other aircraft are within the designated flight zone or the regulation-established flight zone.

13. The method of claim 12, wherein the disabling mechanism comprises at least one of a kill switch or a parachute.

14. The method of claim 1, wherein, when a distance between the UAV and the aircraft decreases below a first threshold distance, the collision alert is broadcast from the UAV at least to the aircraft even when (i) the UAV is within the designated flight zone and (ii) the aircraft is outside of the regulation-established flight zone.

15. The method of claim 14, wherein, when the distance between the UAV and the aircraft decreases below a second threshold distance smaller than the first threshold distance, the failsafe protocol is initiated even when (i) the UAV is within the designated flight zone and (ii) the aircraft is outside of the designated flight zone.

16. The method of claim 1, wherein the collision alert is broadcast from the UAV when the UAV leaves the designated flight zone, even when no other aircraft are within the regulation-established flight zone.

17. The method of claim 1, wherein the failsafe protocol comprises automatically routing the UAV back to the operator of the UAV.

18. The method of claim 1, wherein the failsafe protocol comprises directing the UAV to descend and land.

19. The method of claim 1, wherein the failsafe protocol comprises activating a disabling mechanism for disabling the UAV, the disabling mechanism comprising at least one of a kill switch or a parachute.

20. The method of claim 1, wherein the aircraft is a manned aircraft having a human pilot therewithin.

\* \* \* \* \*